US012770498B2

(12) United States Patent
Field et al.

(10) Patent No.: US 12,770,498 B2
(45) Date of Patent: Oct. 20, 2026

(54) FIRE PROTECTION SYSTEM AND METHOD FOR SYNCHRONIZING CONTROL PANELS AND NOTIFICATION APPLIANCES TECHNICAL FIELD

(71) Applicant: Siemens Industry, Inc., Alpharetta, GA (US)

(72) Inventors: Leslie A. Field, Fair Lawn, NJ (US); Daniel S. Iasso, Towaco, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 18/941,262

(22) Filed: Nov. 8, 2024

(65) Prior Publication Data

US 2026/0134772 A1 May 14, 2026

(51) Int. Cl.
*G08B 29/20* (2006.01)
*G08B 17/00* (2006.01)

(52) U.S. Cl.
CPC ............. *G08B 29/20* (2013.01); *G08B 17/00* (2013.01)

(58) Field of Classification Search
CPC ................................ G08B 29/20; G08B 17/00
See application file for complete search history.

(56) References Cited

U.S. PATENT DOCUMENTS

| | | | | |
|---|---|---|---|---|
| 2011/0130163 | A1 * | 6/2011 | Saban | H04W 88/085 455/517 |
| 2013/0094622 | A1 * | 4/2013 | Yu | G08B 5/38 375/354 |
| 2014/0240105 | A1 * | 8/2014 | Brenner | G08B 25/04 340/286.02 |
| 2015/0317886 | A1 * | 11/2015 | Kidger | H04B 3/30 340/286.02 |
| 2016/0071404 | A1 | 3/2016 | Chiarizio et al. | |
| 2016/0238649 | A1 * | 8/2016 | Edwards | G08B 29/06 |
| 2017/0103027 | A1 * | 4/2017 | Olmstead | G06F 13/4068 |
| 2018/0174432 | A1 | 6/2018 | Pettigrew et al. | |
| 2019/0068385 | A1 * | 2/2019 | Gardner | H02J 1/10 |
| 2020/0235949 | A1 * | 7/2020 | Jones | H04B 3/54 |
| 2025/0056223 | A1 * | 2/2025 | Hwang | H04W 12/06 |

* cited by examiner

*Primary Examiner* — Omer S Khan

(57) ABSTRACT

A fire protection system synchronizes fire panels and notification appliances. A Standard Ethernet Cable couples to a first fire panel to a second fire panel. Each of the first and second fire panels is coupled to a group of fire alarm notification appliances by a notification appliance circuit. The Standard Ethernet Cable communicates first data relating to the fire alarm notification appliances between the first and second fire panels. The Standard Ethernet Cable has a connector including a center tap for communicating second data relating to the fire alarm notification appliances between the first and second fire panels.

17 Claims, 4 Drawing Sheets

FIRE PROTECTION SYSTEM AND METHOD FOR SYNCHRONIZING CONTROL PANELS AND NOTIFICATION APPLIANCES TECHNICAL FIELD

TECHNICAL FIELD

This application relates to the field of fire protection systems and, more particularly, to synchronization of fire control panels for unison operation of fire alarm system notification appliances throughout an entire fire protection system.

BACKGROUND

Fire protection systems must meet safety standards in order to provide necessary detection, signaling, and communications capabilities for the protection of building occupants. NFPA 72 is a U.S. standard published by the National Fire Protection Association for installation of fire alarms and emergency communications. NFPA 72 specifies that fire alarm devices, such as fire alarm system notification strobes, sounders and speaker (voice communication), must meet a defined standard for synchronization of timing variance. Synchronization of strobes & speakers is important for maximizing their effectiveness in alerting building occupants to emergencies. Also, out of sync strobes can cause epileptic seizures for some people.

Conventional systems implement RS485 for general communications between fire alarm devices. Such systems add a sync wire to provide the backbone hardware mechanism to sync industrial equipment, such as strobes. However, conventional systems are limited today because they primarily provide synchronized strobes to a single power notification circuit. Other mechanisms to extend the area that is synchronized involve using a dedicated hardware sync lines connected to circuits that are capable of being a bell follower. This approach requires a dedicated wire for the sync line as well as introducing a single point of failure.

SUMMARY

In accordance with one embodiment of the disclosure, there is provided a Standard Ethernet cable approach for providing a sync pulse and device communications among fire panels, such as a fire alarm control panel or a fire alarm transponder, of a fire protection system using the center tap. In particular, a Standard Ethernet Cable provides the ability to utilize the center tap of the Ethernet wire solution used to network fire systems for meeting defined standards for synchronization timing variance of fire alarm notification appliances. Conventional network-based solutions, such as IEEE 1588 time sync, suffer from availability issues. If the convention system is started or restarted, the endpoints may not have a synced time yet, thus cannot drive synchronized outputs. The Ethernet center tap wire approach provides a sync pulse between fire panels on the same system with minimal variance. Accordingly, notification appliances of multi-floor buildings and large campuses may be synchronized with the period required by safety standards, such as UL 1971.

A fire protection system is designed to synchronize fire panels (e.g., fire alarm control panels and a fire alarm transponders) and notification appliances. This system includes a first fire panel and a second fire panel, both part of the fire protection system, connected via a Standard Ethernet Cable. The first fire panel is linked to a first group of fire alarm notification appliances through a first notification appliance circuit, while the second fire panel is linked to a second group of fire alarm notification appliances through a second notification appliance circuit. The Standard Ethernet Cable facilitates the communication of first data related to the first and second groups of fire alarm notification appliances between the two fire panels. The Standard Ethernet Cable features a connector with a center tap that enables the communication of second data related to the first and second groups of fire alarm notification appliances between the first and second fire panels.

One aspect is a fire protection system for synchronizing control panels and notification appliances comprising a first fire control panel of the fire protection system, a second fire control panel of the fire protection system, and a Standard Ethernet Cable coupled to the first and second first alarm control panels. The first fire control panel is coupled to a first group of fire alarm notification appliances by a first notification appliance circuit, and the second fire control panel is coupled to a second group of fire alarm notification appliances by a second notification appliance circuit. The Standard Ethernet Cable communicates first data relating to the first and second groups of fire alarm notification appliances between the first and second fire control panels. The Standard Ethernet Cable has a connector including a center tap for communicating second data relating to the first and second groups of fire alarm notification appliances between the first and second fire control panels.

Another aspect is a method of a fire protection system for synchronizing control panels and notification appliances. A first fire control panel of the fire protection system is coupled to a first group of fire alarm notification appliances by a first notification appliance circuit. A second fire control panel of the fire protection system is coupled to a second group of fire alarm notification appliances by a second notification appliance circuit. A Standard Ethernet Cable is coupled to the first fire control panel and the second fire control panel. First data relating to the first and second groups of fire alarm notification appliances are communicated between the first and second fire control panels. Second data relating to the first and second groups of fire alarm notification applications are communicated via a center tap of a connector of the Standard Ethernet Cable between the first and second fire control panels.

Still another aspect is a non-transitory computer readable medium including executable instructions which, when executed, causes at least one processor to synchronize control panels and notification appliances of a fire protection system by performing the above method.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
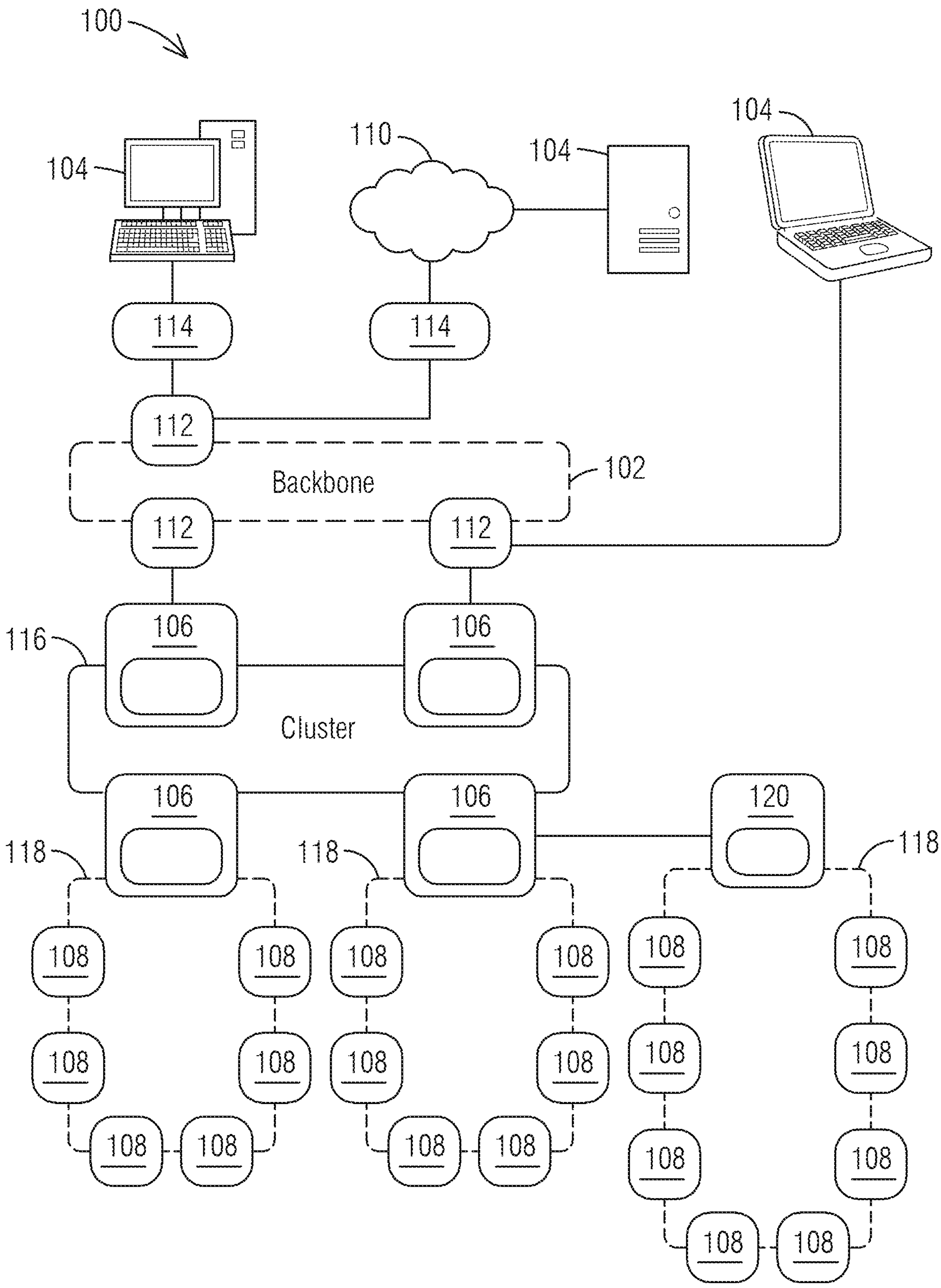
FIG. 1 is an illustration of a fire protection system in an example implementation that is operable to employ techniques described herein.

Various technologies that pertain to systems and methods that facilitate sync pulse and device communications among fire panels will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The fire protection system includes multiple fire panels, such as a fire alarm control panel or a fire alarm transponder, that utilize a single Standard Ethernet Cable for providing a sync pulse and device communications. The system provides a hardware-based solution to the sync pulse feature that is capable of execution within a fraction of a second (including microseconds and nanoseconds) and reliably available.

Referring to FIG. 1, there is shown a fire protection system 100 in an example implementation that is operable to employ techniques described herein. The system 100 is configured to manage one or more fire protection parameters for a facility, such as fire extinguishers, fire suppression systems, fire alarms, emergency lighting, facility portals, and the like. The system 100 may comprise one or more management level networks 102, such as a network backbone or core network, for connectivity to components of a management devices 104, controls panels 106, and field devices 108. A management level network 102 may be a local area network for interconnecting devices, such as fire panels and terminals, for communication. For some embodiments, the management level network 102 may be a fiber-optic backbone.

The example system 100 may comprise one or more management devices 104, such as a management workstation, server, or remote device, connecting through a wired or wireless network 110, and allows the setting and/or changing of various controls of the system. The management devices 104 connect to the management level network 102 for communication with the control panels 106 and field device 108. For some embodiments, the management level network may include Ethernet switches 112 that connect the management devices 104 and individual clusters of control panels 106 and field devices 108 via the network 102. Also, one or more management devices 104 may utilize interface devices 114, such as gateways and routers, to connect to the management level network 102. While a brief description of the system 100 is provided below, it will be understood that the system 100 described herein is only one example of a particular form or configuration for a fire protection system. The system 100 may be implemented in any other suitable manner without departing from the scope of this disclosure. The management devices are configured to provide overall control and monitoring of a field device 108, a group of field devices, or the system 100.

For the illustrated embodiment of FIG. 1, the fire protection system 100 provides connectivity based on one or more communication protocols to subsystems for various facility parameters. Each subsystem, such as cluster 116, includes a network of fire control panels 106 and fire terminals (not shown). One or more fire control panels 106 of the subnetwork may be connected to the management level network 102 via Ethernet switches 112. One or more fire control panels 106 may be coupled to various fire transponders 120 and/or field devices 108, such as fire alarm notification appliances, for monitoring and/or controlling areas within a building or group of buildings. The fire control panels 106 process message generated by the system and trigger alarm signals. The fire control panels 106 also provide a user interface with customized user prompting texts to support the correct action in case of a fire event. Fire transponders 120 are similar to fire control panels 106, like a headless fire control panel. In particular, the fire transponders communicate with the fire control panels 106 to provide basic fire alarm functions and system status. The fire transponders 120 may connect field devices to a fire control panel 106. Each of these fire control panels 106 of the fire protection system 100 may be coupled to a group of field devices 108, i.e., fire alarm notification appliances, directly by a notification appliance circuit 118 or via one or more fire transponders 120. Examples of these field devices 108, i.e., fire alarm notification appliances, include, but are not limited to, alarming devices (such as strobe devices, horn strobes, speakers, speaker-strobes, and bells), fire detectors, floor repeater terminals & displays, mimic display drivers, input/output modules, and the like. Strobe devices, in particular, provide visual signals by flashing in a synchronized pattern.

The illustration of the system 100 in FIG. 1 is not meant to imply physical or architectural limitations to the manner in which different illustrative embodiments may be implemented. For example, the system 100 may communicate signals over different types of network topologies, such as a linear (bus) topology, a ring topology, or a star topology. Also, other components in addition to and/or in place of the ones illustrated may be used, and some components may be unnecessary in some illustrative embodiments.

Figure 2:
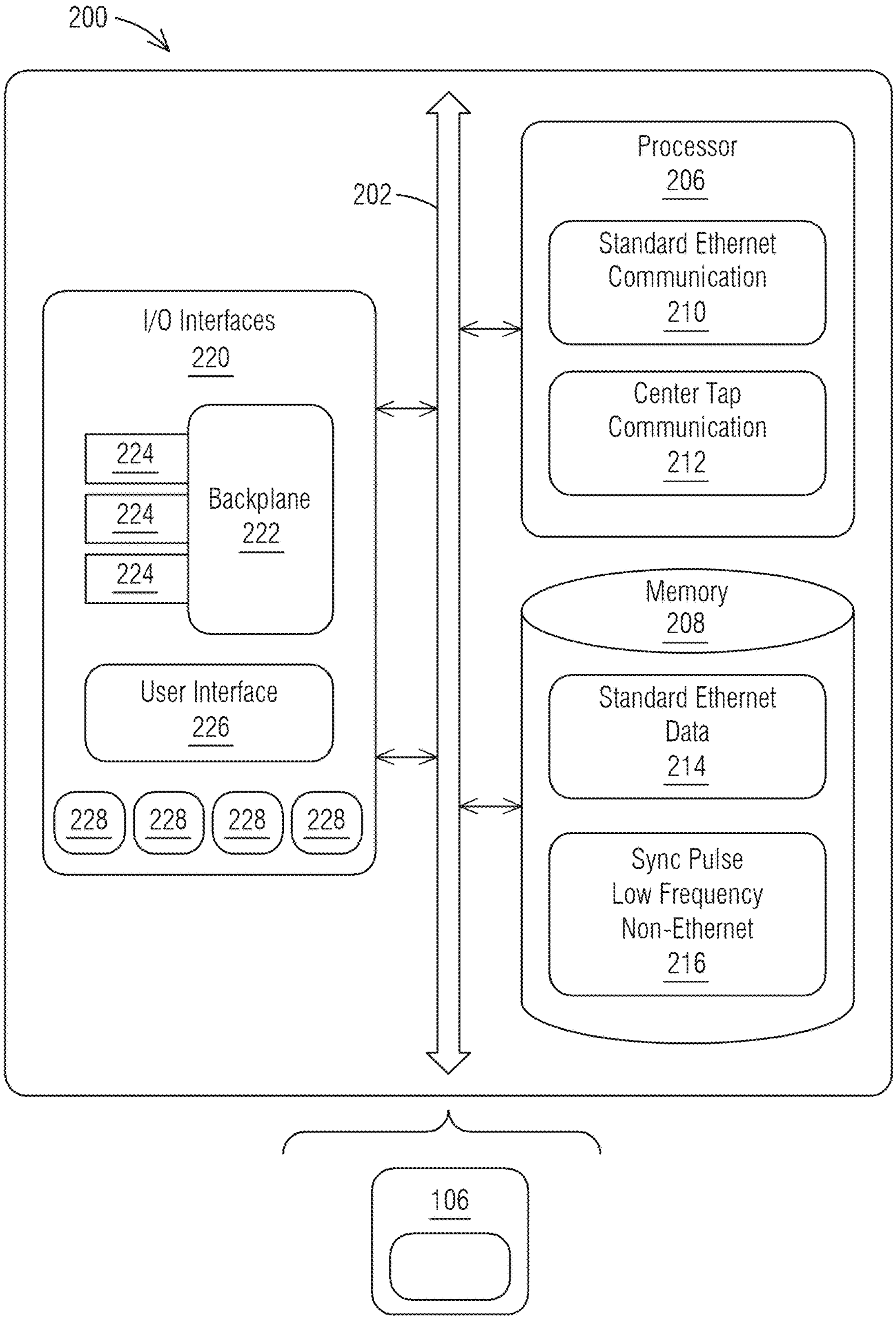
FIG. 2 depicts an example implementation of a fire panel, such as a fire control panel or fire transponder, of FIG. 1.

FIG. 2 represents example device components 200 of a fire panel, such as a fire control panel 106 or a fire transponder 120, of the fire protection system 100. The device components 200 comprise a communication bus 202 for interconnecting other device components directly or indirectly. The other device components include one or more processors 206 and one or more memory components 208.

The processor or processors 206 may execute code and process data received from other components of the device components 200, such as information stored at the memory component 208. The code associated with the system 100 and stored by the memory component 208 may include, but is not limited to, operating systems, applications, software modules, drivers, and the like. An operating system includes executable code that controls basic functions, such as interactions among the various components of the device components 200, communication with external devices, and storage and retrieval of code and data to and from the memory component 208.

Each application includes executable code to provide specific functionality for the processor 206 and/or remaining components of the fire panel 106, 120. Examples of applications executable by the processor 206 include, but are not limited to, a standard Ethernet communication module 210 and a center tap communication module 212. The standard Ethernet communication module 210 communicates first data relating to the groups of field devices 108, i.e., fire alarm notification appliances, between fire panels 106, 120 via a Standard Ethernet Cable coupled to two or more fire panels. The center tap communication module 212 controls a connector of the Standard Ethernet Cable, and the connector includes a center tap for communicating second data relating to the field devices 108, i.e., fire alarm notification appliances, between the first and second fire panels.

Data stored at the memory component 208 are information that may be referenced and/or manipulated by an operating system or application for performing functions of the fire panel 106, 120 and the field device 108. Examples of data associated with the system 100 and stored by the memory component 208 may include, but are not limited to, first data, such as standard Ethernet data 214, and second data, such as sync pulses, low frequency signals, and/or non-Ethernet signals 216. The standard Ethernet data 214 includes general information relating to monitoring and controller the operations of the groups of field devices 108. The sync pulse 216 relates to the groups of fire alarm notification appliances and is transmitted between the fire panels 106, 120 via the center tap of the connector to activate visually strobe devices with minimal timing variance in response to the sync pulse, such as less than 1 microsecond. The low frequency signals relates to the groups of fire alarm notification appliances and is transmitted between the fire panels 106, 120 via the center tap of the connector to communicate information, in addition to the standard Ethernet data 214, between fire panels 106, 120. The non-Ethernet signals 216 relates to the groups of fire alarm notification appliances and is transmitted between the fire panels 106, 120 via the center tap of the connector to provide a secondary or parallel channel of communication alongside a main conversation which will provide feedback for clear communication.

An I/O interface 220 of the device components 200 may include one or more input components and one or more output components. The input components and the output components of the device components 200 may include one or more visual, audio, mechanical, and/or other components. The I/O interface 220 may include a backplane 222 of a card cage mounted to a housing panel of the fire panel 106, 120 for inserting module bus cards 224. Examples of module bus cards or module line cards include, but are not limited to, line cards with network lines, detector lines, analog address loops, digital address loops, or interactive lines as well as I/O cards with configurable or programmable inputs/outputs, monitored outputs, or other outputs such as alarm, fault, or local alarm. For example, the module bus or line card 224 may be connected to the backplane 222 of a mainboard for a registered RJ45 jack. For one embodiment, analog ground (AGND) reference planes may be organized by tracing impedance-matched pairs between physical layer (PHY) and magnetics, minimizing the distance between the magnetics and the registered RJ45 jack, and maintaining wire lengths to be matched. Another embodiment allows organizing both AGND between PHY-mag traces and a separate magnetics ground (MGND) between mag-RJ45 traces. For this other embodiment, all pairs are traced with impedance matching and matched lengths, and each mag-45 path has it own dedicated reference plane.

The input and output components 220 may include a user interface 226 for interaction with a user of the device. The user interface 222 may include a combination of hardware and software to provide a user with a desired user experience. The input and output components 220 may further include other input components and/or output components such as, but not limited to, RJ45 connectors.

It is to be understood that FIG. 2 is provided for illustrative purposes only to represent examples of the device components 200 of the fire panel 106, 120 and/or field device 108 and is not intended to be a complete diagram of the various components that may be utilized by the system. Therefore, the device 106, 108, 120 may include various other components not shown in FIG. 2, may include a combination of two or more components, or a division of a particular component into two or more separate components, and still be within the scope of the present invention.

Figure 3:
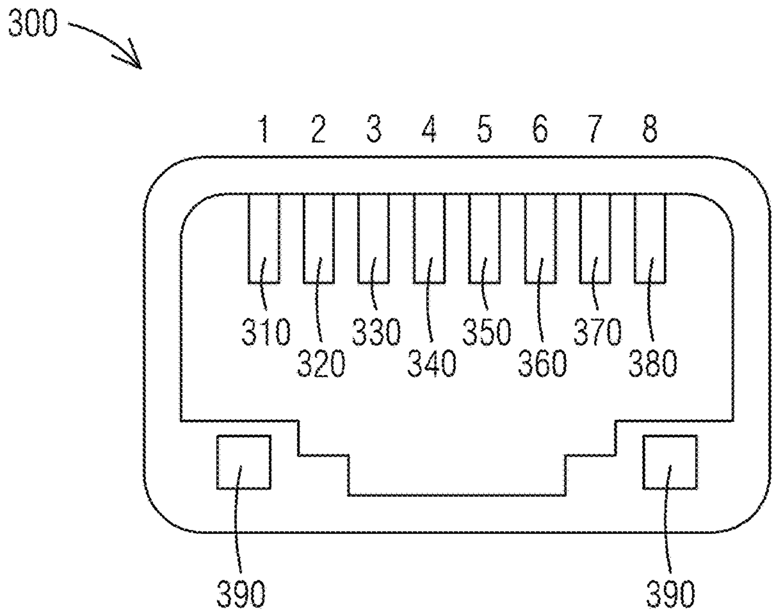
FIG. 3 depicts an example implementation of a Standard Ethernet Cable for providing a sync pulse and device communications between fire panels of FIG. 1.

Referring to FIG. 3, there is represented an example implementation of a single Standard Ethernet Cable for providing a sync pulse and device communications between fire panels, such as between fire control panels 106 or between a fire control panel 106 and a fire transponder 120. FIG. 3, in particular, provides a schematic diagram of line connections (and indicators) of a connector 300, also known as a jack, port, or socket, that connect to one end of the Standard Ethernet Cable. An example of the connector 300 is an RJ45 connector. For the embodiment shown in FIG. 3, the connector 300 includes a first line connection 310, second line connection 320, third line connection 330, fourth line connection 340, fifth line connection 350, sixth line connection 360, seventh 370, and eighth line connection 380 to make contact with wires in the Standard Ethernet Cable. The connector may also include indicator lights 390 to indicate the status, such as an operating speed, of the connector. For example, the first and second line connections 310, 320 may be used to communicate standard Ethernet data between fire panels 106, 120, the third and sixth line connections 330, 360 are auxiliary lines that may also be used to communicate standard Ethernet data, and the seventh and eighth line connections 370, 380 may be used for ground connections.

Standard category Standard Ethernet Cables (CAT5, CAT6, CAT7, CAT8, . . . ) typically applied for Power over Ethernet ("PoE") may be used for the fire protection system 100. For such Standard Ethernet Cables, the wires reserved for Power over Ethernet are used as channels for communicating sync pulses, low frequency data communication, and/or non-Ethernet communication. In this manner, the sync pulse may be provided over the "PoE wire" of the connector 300. In particular the center tap of the connector, such as an RJ45 connector, is used for the synchronization channel and/or the low frequency communication channel. For example, the RJ45 center tap and bridge rectifier may be used for synchronizing communications to provision both Power over Ethernet (PoE) and synchronization pulses via the center tap. In addition, a redundant communication channel may be implemented, other than just the ethernet. Data and local area networks pass through network transformers that have center taps. A predetermined signal may be applied to these center taps of the transformers, where the current splits between two halves of the coils. At the receiving end, the voltage is extracted from the center taps of the transformers, which are connected to bridge rectifiers.

Figure 4:
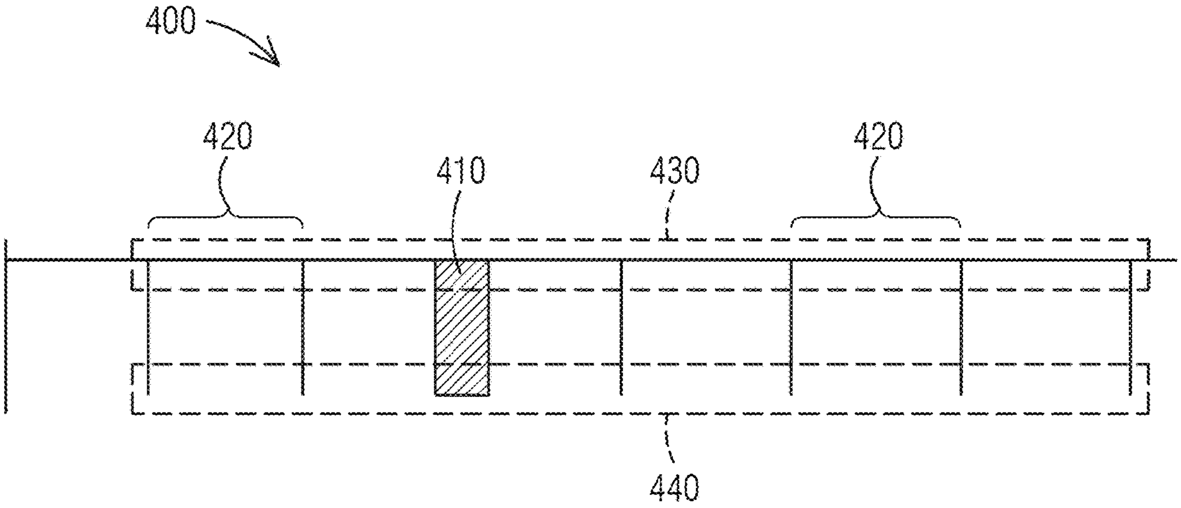
FIG. 4 is a graphic view of the sync pulse in an example implementation that may be communicated between fire panels.

Referring to FIG. 4, there is shown a graphic view of the sync pulse 410 in an example implementation that may be communicated between fire panels, such as between fire control panels 106 or between a fire control panel 106 and a fire transponder 120. This graphic view represents a sample wave form 400 for a degrade single. The example sync pulse 410 would have a duty cycle 420 with a high time (charge time) 430 and a low time 440. For some embodiments, as illustrated in FIG. 4, the duty cycle 420 may have a high time 430 of about 95% and a low time 440 of about 5%. When the waveform is low, it may be used to inform the fire panels 106, 120 and/or the field devices 108 of the system 100 of the periodicity of the signal. For example, the devices 106, 108, 120 may understand that the sync pulse drops lower every 950 msec, so every listener of this pulse knows 950 msec has elapsed since the last pulse. Also, additional pulses and their modulation times may be used to send information to the listeners, i.e., devices 106, 108, 120.

Figure 5:
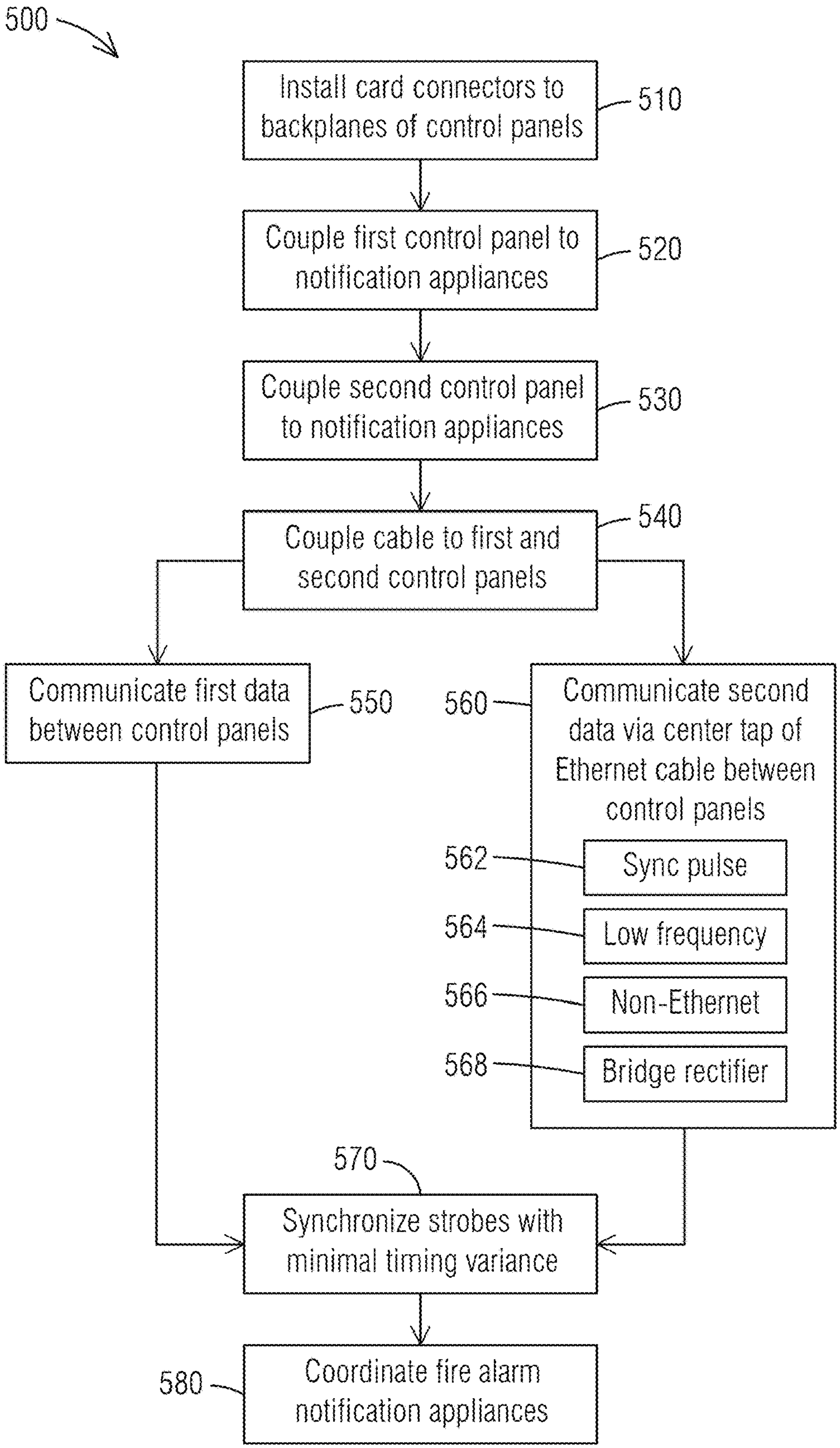
FIG. 5 is a flow diagram of an operation of the system in an example implementation that is operable to employ techniques described herein.

Referring to FIG. 5, there is shown a flow diagram of an operation 500 of the system in an example implementation that is operable to employ techniques described herein. The operation 500 represents a method of a fire protection system 100 for synchronizing control panels 106, transponders 120, and notification appliances 108. The fire protection system 100 and its devices are setup and configured for operation, in which the system includes multiple fire panels 106, 120, such as fire control panels 106 or such as a fire control panel 106 and a fire transponder 120. For some embodiments, the system 100 is a single fire protection system of a multi-floor building or a multi-building campus in which the field device 108, such as fire alarm notification appliances, are associated solely with the single system. For some embodiments, the card cages of the fire panel 106, 120 includes a backplane 222 for receiving (510) module bus cards 224, such as a line card for implementing RJ45 connectors.

Subsequent to installing (510) module bus cards 224 having connectors to the backplane 222 of the fire panel 106, 120, a first fire panel 106, 120 of the fire protection system 100 is coupled (520) to multiple notification appliances ("first group of fire alarm notification appliances") by a first notification appliance circuit ("NAC"). Similarly, a second fire panel 106, 120 of the fire protection system 100 is coupled to multiple notification appliances ("second group of fire alarm notification appliances") by a second NAC. Also, a Standard Ethernet Cable is coupled (530) to the first fire panel and the second fire panel.

In response to setting up and configuring the fire protection system 100 and its devices, including the coupling of panels-to-notification appliances 520, 530 and panel-to-panel 540, first data relating to the first and second groups of fire alarm notification appliances 108 are communicated (550) between the first and second fire panels 106, 120. Also, in response to setting up and configuring the system 100 and its devices, second data relating to the first and second groups of fire alarm notification applications 108 are communicated (560) between the first and second fire panels 106, 120. The second data are communicated (560) via a center tap of the connector 300 of the Standard Ethernet Cable between the first and second fire panels 106, 120. A transformer of the connector 300 includes the center tap, which is a contact point along the winding of the transformer or an inductor thereof.

For some embodiments, communicating (560) the second data includes utilizing the center tap of the connector 300 to transmit (562) the sync pulse relating to the first and second groups of fire alarm notification appliances 108 from the first fire panel 106, 120 to the second fire panel 106, 120. For some embodiments, communicating (560) the second data includes utilizing the center tap of the connector 300 to transmit (564) a low frequency communication relating to the first and second groups of fire alarm notification appliances 108 from the first fire panel 106, 120 to the second fire panel 106, 120. For some embodiments, communicating the second data includes utilizing the center tap of the connector 300 to transmit (566) a non-Ethernet communication relating to the first and second groups of fire alarm notification appliances 108 from the first fire panel 106, 120 to the second fire panel 106, 120.

For some embodiments, communicating (560) the second data includes utilizing (568) one or more bridge rectifiers to transmit the sync pulse relating to the first and second groups of fire alarm notification appliances 108 from the first fire panel 106, 120 to the second fire panel 106, 120. In this manner, the system may provision both Power over Ethernet (PoE) and synchronization pulses via the center tap.

For each fire panel 106, 120 of the fire protection system 100, the first group of fire alarm notification appliances 108 includes a first strobe device and the second group of fire alarm notification appliances 108 includes a second strobe device. The first strobe device and the second strobe device are activated visually (570) with minimal timing variance (less than 1 microsecond) in response to transmitting (560) the sync pulse between the first and second fire panels. In addition, to the strobe devices of the fire alarm notification appliances, other field devices (including fire alarm notification devices) are coordinated (580) by signal between fire panels 106, 120 via the center tap of the Standard Ethernet Cable.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

The invention claimed is:

1. A fire protection system for synchronizing fire panels and notification appliances comprising:

a first fire panel of the fire protection system coupled to a first plurality of fire alarm notification appliances by a first notification appliance circuit;

a second fire panel of the fire protection system coupled to a second plurality of fire alarm notification appliances by a second notification appliance circuit; and a Standard Ethernet Cable coupled to the first and second fire panels, the Standard Ethernet Cable communicating first data relating to the first and second pluralities of fire alarm notification appliances between the first and second fire panels as standard Ethernet data over data wire pairs of the Standard Ethernet Cable, the Standard Ethernet Cable having a connector including a center tap for communicating second data including a sync pulse relating to the first and second pluralities of fire alarm notification appliances between the first and second fire panels, wherein wires of the Standard Ethernet Cable reserved for Power over Ethernet are used as a channel for communicating the sync pulse via the center tap;

wherein the center tap of the connector is utilized for transmitting a sync pulse relating to the first and second pluralities of fire alarm notification appliances from the first fire panel to the second fire panel.

2. The fire protection system as described in claim 1, wherein:

the first plurality of fire alarm notification appliances includes a first strobe device and the second plurality of fire alarm notification appliances includes a second strobe device; and the first and second strobe devices activate visually with minimal timing variance in response to the sync pulse transmitted between the first and second fire panels.

3. The fire protection system as described in claim 1, wherein the first and second pluralities of fire alarm notification appliances are associated solely with a single fire protection system of a multi-floor building or a multi-building campus.

4. The fire protection system as described in claim 1, wherein the center tap of the connector is utilized for transmitting a low frequency communication relating to the first and second pluralities of fire alarm notification appliances from the first fire panel to the second fire panel.

5. The fire protection system as described in claim 1, wherein the center tap of the connector is utilized for transmitting a non-Ethernet communication relating to the first and second pluralities of fire alarm notification appliances from the first fire panel to the second fire panel.

6. The fire protection system as described in claim 1, wherein at least one of the first and second fire panels includes at least one bridge rectifier utilized for transmitting a sync pulse relating to the first and second pluralities of fire alarm notification appliances from the first fire panel to the second fire panel for provisioning Power over Ethernet (POE) and synchronization pulses via the center tap.

7. A method of a fire protection system for synchronizing fire panels and notification appliances, the method comprising:

coupling a first fire panel of the fire protection system to a first plurality of fire alarm notification appliances by a first notification appliance circuit;

coupling a second fire panel of the fire protection system to a second plurality of fire alarm notification appliances by a second notification appliance circuit;

coupling a Standard Ethernet Cable to the first fire panel and the second fire panel;

communicating first data relating to the first and second pluralities of fire alarm notification appliances between the first and second fire panels as standard Ethernet data over data wire pairs of the Standard Ethernet Cable; and communicating second data including a sync pulse relating to the first and second pluralities of fire alarm notification applications via a center tap of a connector of the Standard Ethernet Cable between the first and second fire panels, wherein wires of the Standard Ethernet Cable reserved for Power over Ethernet are used as a channel for communicating the sync pulse via the center tap;

wherein communicating the second data includes utilizing the center tap of the connector to transmit a sync pulse relating to the first and second pluralities of fire alarm notification appliances from the first fire panel to the second fire panel.

8. The method as described in claim 7, wherein the first plurality of fire alarm notification appliances includes a first strobe device and the second plurality of fire alarm notification appliances includes a second strobe device, the method further comprising:

activating visually the first and second strobe devices with minimal timing variance in response to the sync pulse transmitted between the first and second fire panels.

9. The method as described in claim 7, wherein the first and second pluralities of fire alarm notification appliances are associated solely with a single fire protection system of a multi-floor building or a multi-building campus.

10. The method as described in claim 7, wherein communicating the second data includes utilizing the center tap of the connector to transmit a low frequency communication relating to the first and second pluralities of fire alarm notification appliances from the first fire panel to the second fire panel.

11. The method as described in claim 7, wherein communicating the second data includes utilizing the center tap of the connector to transmit a non-Ethernet communication relating to the first and second pluralities of fire alarm notification appliances from the first fire panel to the second fire panel.

12. The method as described in claim 7, wherein communicating the second data includes utilizing at least one bridge rectifier to transmit a sync pulse relating to the first and second pluralities of fire alarm notification appliances from the first fire panel to the second fire panel.

13. A non-transitory computer readable medium including executable instructions which, when executed, causes at least one processor to synchronize fire panels and notification appliances of a fire protection system by:

coupling a first fire panel of the fire protection system to a first plurality of fire alarm notification appliances by a first notification appliance circuit;

coupling a second fire panel of the fire protection system to a second plurality of fire alarm notification appliances by a second notification appliance circuit;

coupling a Standard Ethernet Cable to the first fire panel and the second fire panel;

communicating first data relating to the first and second pluralities of fire alarm notification appliances between the first and second fire panels as standard Ethernet data over data wire pairs of the Standard Ethernet Cable; and communicating second data including a sync pulse relating to the first and second pluralities of fire alarm notification applications via a center tap of a connector of the Standard Ethernet Cable between the first and second fire panels, wherein wires of the Standard Ethernet Cable reserved for Power over Ethernet are used as a channel for communicating the sync pulse via the center tap;

wherein communicating the second data includes utilizing the center tap of the connector to transmit a sync pulse relating to the first and second pluralities of fire alarm notification appliances from the first fire panel to the second fire panel.

14. The non-transitory computer readable medium as described in claim 13, wherein the first plurality of fire alarm notification appliances includes a first strobe device and the second plurality of fire alarm notification appliances includes a second strobe device, the at least one processor to further:

activate visually the first and second strobe devices with minimal timing variance in response to the sync pulse transmitted between the first and second fire panels.

15. The non-transitory computer readable medium as described in claim 13, wherein communicating the second data includes utilizing the center tap of the connector to transmit a low frequency communication relating to the first and second pluralities of fire alarm notification appliances from the first fire panel to the second fire panel.

16. The non-transitory computer readable medium as described in claim 13, wherein communicating the second data includes utilizing the center tap of the connector to transmit a non-Ethernet communication relating to the first and second pluralities of fire alarm notification appliances from the first fire panel to the second fire panel.

17. The non-transitory computer readable medium as described in claim 13, wherein communicating the second data includes utilizing at least one bridge rectifier to transmit a sync pulse relating to the first and second pluralities of fire alarm notification appliances from the first fire panel to the second fire panel.

* * * * *